(12) United States Patent
Kavulak et al.

(10) Patent No.: US 8,238,536 B1
(45) Date of Patent: Aug. 7, 2012

(54) CALL REDIRECT VIA CENTRALIZED BRIDGES

(75) Inventors: Paul H. Kavulak, Louisville, NE (US); Sean M. Owens, Omaha, NE (US)

(73) Assignee: West Corporation, Omaha, NE (US)

( * ) Notice: Subject to any disclaimer, the term of this patent is extended or adjusted under 35 U.S.C. 154(b) by 1357 days.

(21) Appl. No.: 11/100,323

(22) Filed: Apr. 6, 2005

Related U.S. Application Data

(60) Provisional application No. 60/559,994, filed on Apr. 6, 2004.

(51) Int. Cl.
*H04M 3/42* (2006.01)

(52) U.S. Cl. .......... 379/202.01; 379/114.02; 379/210.01

(58) Field of Classification Search ............. 379/202.01, 379/220.01, 114.01, 114.02, 401, 210.01
See application file for complete search history.

(56) References Cited

U.S. PATENT DOCUMENTS

| | | |
|---|---|---|
| 5,027,387 A | 6/1991 | Moll |
| 5,631,904 A | 5/1997 | Fitser et al. |
| 5,825,858 A | 10/1998 | Shaffer et al. |
| 5,883,964 A | 3/1999 | Alleman |
| 5,987,112 A | 11/1999 | Chakravarti et al. |
| 6,035,027 A * | 3/2000 | Alleman ................... 379/205.01 |
| 6,078,654 A * | 6/2000 | Mashinsky ............... 379/207.13 |
| 6,144,667 A | 11/2000 | Doshi et al. |
| 6,212,268 B1 | 4/2001 | Nielsen |
| 6,236,644 B1 | 5/2001 | Shuman et al. |
| 6,253,249 B1 | 6/2001 | Belzile |
| 6,307,928 B1 | 10/2001 | Yamasaki |
| 6,308,070 B1 * | 10/2001 | Laster ............................ 455/445 |
| 6,453,034 B1 | 9/2002 | Donovan et al. |
| 6,466,550 B1 * | 10/2002 | Foster et al. ................... 370/261 |
| 6,512,764 B1 | 1/2003 | Carew et al. |
| 6,549,229 B1 | 4/2003 | Kirby et al. |
| 6,584,076 B1 | 6/2003 | Aravamudan et al. |
| 6,594,257 B1 | 7/2003 | Doshi et al. |
| 6,693,661 B1 | 2/2004 | Vanderwilt et al. |
| 7,174,346 B1 | 2/2007 | Gharachorloo et al. |
| 7,412,486 B1 | 8/2008 | Petrack et al. |
| 2001/0002927 A1 | 6/2001 | Detampel, Jr. et al. |
| 2001/0054070 A1 | 12/2001 | Savage et al. |
| 2002/0087858 A1 | 7/2002 | Oliver et al. |
| 2003/0026406 A1 | 2/2003 | Ernstrom et al. |
| 2003/0103468 A1 | 6/2003 | Seavers et al. |
| 2003/0118160 A1 | 6/2003 | Holt et al. |
| 2003/0185362 A1 * | 10/2003 | Kim .............................. 379/120 |

(Continued)

FOREIGN PATENT DOCUMENTS

WO     WO 9724860 A2 * 7/1997

OTHER PUBLICATIONS

Retske, Gene "The International CallBack", 1995, Flatiron Publishing, First Edition, pp. 11-17, 44, 53, 62 and 67.*

(Continued)

*Primary Examiner* — Ahmad Matar
*Assistant Examiner* — Oleg Asanbayev

(57) ABSTRACT

A system, method, and computer readable medium for redirecting a call via centralized bridges comprises a first conferencing platform based in the United States, a second conferencing platform based in a second country, and a third conferencing platform based in a third country, wherein the first conferencing platform dials the second conferencing platform and the third conferencing platform to provide a conference call between the second conferencing platform and the third conferencing platform.

4 Claims, 1 Drawing Sheet

U.S. PATENT DOCUMENTS

2004/0062210 A1* 4/2004 Genter et al. ............... 370/260
2004/0141606 A1* 7/2004 Torvinen ................. 379/202.01
2005/0135280 A1 6/2005 Lam
2005/0288961 A1* 12/2005 Tabrizi ............................. 705/1

OTHER PUBLICATIONS

Spectel, Grand Scale Global Conferencing Power, www.spectel.com, Apr. 13, 2005.
Vail, Vail Conferencing, www.vailsys.com, 2003.

* cited by examiner

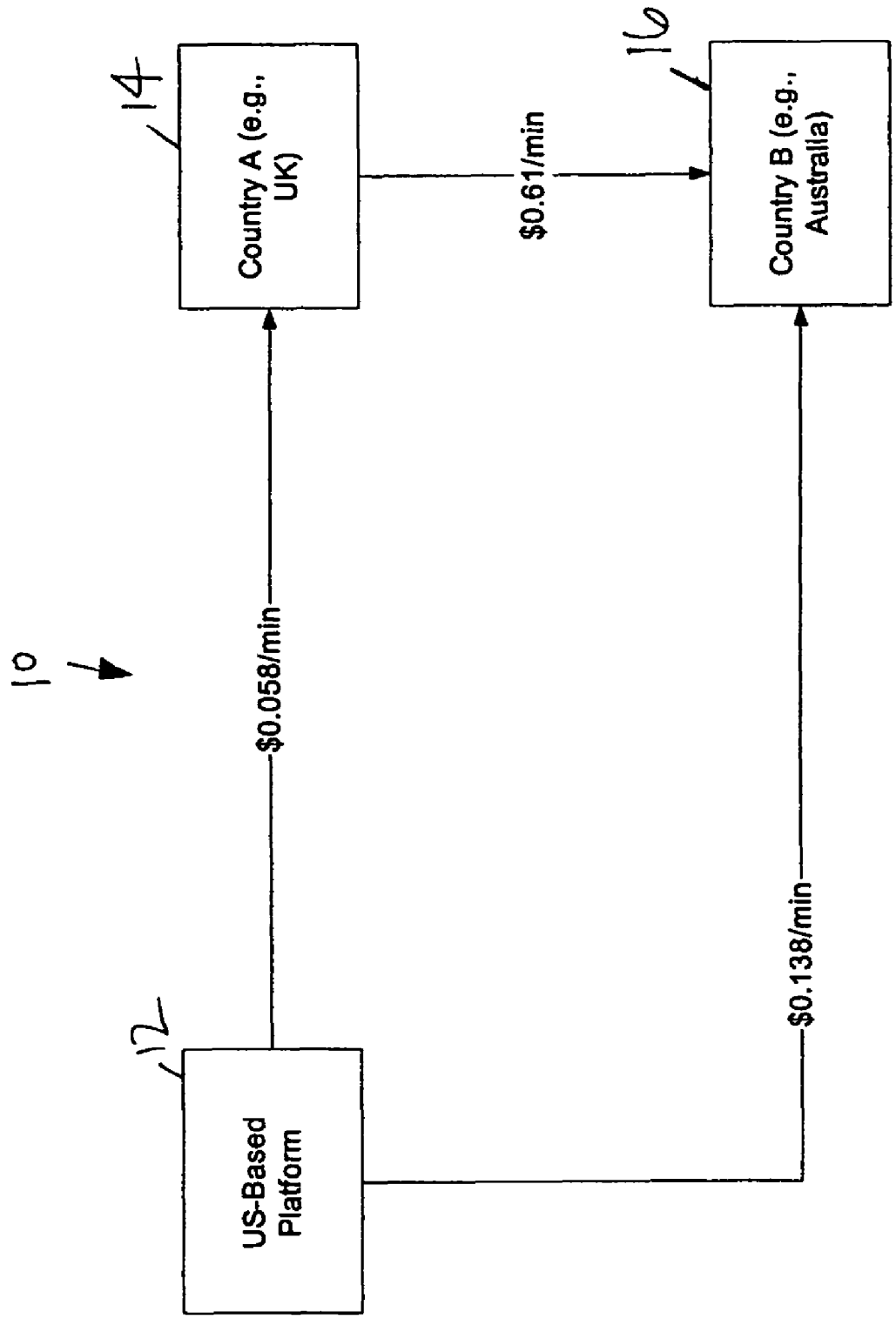

//‌

CALL REDIRECT VIA CENTRALIZED BRIDGES

CROSS-REFERENCE TO RELATED APPLICATIONS

The present invention is related to and claims the benefit of U.S. provisional patent application Ser. No. 60/559,994, filed on Apr. 6, 2004, entitled CALL REDIRECT VIA CENTRALIZED BRIDGES IN THE UNITED STATES, the contents of which are enclosed by reference herein.

FIELD OF THE INVENTION

The present invention relates generally to call redirect, and, more particularly, to a system, method, and computer readable medium for redirecting a call via centralized bridges.

BACKGROUND OF THE INVENTION

Typically, the rates applicable to calls originating in the United States and dialed to overseas locations are much less costly than the rates applicable to calls originating from overseas locations and dialed to the United States. Also, the typical rates for US-origin international calls dialed to overseas locations are less than the rates applicable to calls originating from a first foreign country and dialed to a second foreign country. Therefore, what is needed is a system, method, and computer readable medium for overcoming the aforementioned problems and limitations.

SUMMARY OF THE INVENTION

The present invention discloses a system, method, and computer readable medium for redirecting a call via centralized bridges. In one embodiment, a system for redirecting a call via centralized bridges comprises a first conferencing platform based in the United States, a second conferencing platform based in a second country, and a third conferencing platform based in a third country, wherein the first conferencing platform dials the second conferencing platform and the third conferencing platform to provide a conference call between the second conferencing platform and the third conferencing platform.

In another embodiment, a method for redirecting a call via centralized bridges comprises dialing, by a first conferencing platform based in the United States, a second conferencing platform based in a second country and a third conferencing platform based in a third country to provide a conference call between the second conferencing platform and the third conferencing platform, wherein the second conferencing platform is based outside of the United States, and wherein the third conferencing platform is based outside of the United States.

In a further embodiment, a computer readable medium comprising instructions for: dialing, by a first conferencing platform based in the United States, a second conferencing platform based in a second country and a third conferencing platform based in a third country to provide a conference call between the second conferencing platform and the third conferencing platform, wherein the second conferencing platform is based outside of the United States, and wherein the third conferencing platform is based outside of the United States.

BRIEF DESCRIPTION OF THE DRAWINGS

FIG. 1 depicts a system in accordance with a preferred embodiment of the present invention.

DETAILED DESCRIPTION OF THE INVENTION

The present invention replaces a telephone call originating in a first foreign country dialed to one or more other foreign countries, with respective outbound calls originating from a bridge or other platform element sited in the US being dialed to each one of the foreign countries involved in the call. Referring now to FIG. 1, a system 10 of the present invention includes a conferencing platform based in the United States 12 and other conferencing platforms based in other countries. Such conferencing platforms include a conferencing platform based, for example, in the United Kingdom 14, and a conferencing platform based, for example, in Australia 16.

For conference calls involving numerous international conferees, the cost savings provided by the present invention are considerable. Assume, for example, that an upcoming conference call is to occur between international conferees who are located in at least two overseas nations, for example, the United Kingdom and Australia. Assume further that the long distance international telecom rate for a call originating in the United Kingdom dialed to a telephone number in Australia is $0.61 per minute. Assume further that the conferencing platform 12 (including a bridge) is located in the United States and is adapted to perform outdials on demand to conferees located overseas, for example in the United Kingdom and Australia. At a prescheduled time, or in response to some action taken by the conferees located in the United Kingdom and/or Australia, the US-based conferencing platform 12 can outdial the conferees in, for example, the United Kingdom and Australia. Such an action would trigger the lower US-origin international telecom rates for these outdialed calls. Assuming for example, that the international long distance telecom rate for calls dialed from the United States to the United Kingdom is $0.058 dollars per minute, and further assume that the same rate applicable to a call dialed from the United States to Australia is $0.138 dollars per minute.

In this example, replacing the international call dialed from the United Kingdom to Australia with two international calls dialed from the United States to the United Kingdom and to Australia, respectively, yields a cost savings of $0.414 dollars per minute for this conference call. In this scenario, the conferencing streams that would otherwise be routed directly from the United Kingdom conferee to the Australia conferee are routed instead from the United Kingdom conferee to the United States platform, and then from the United States platform to the Australia conferee.

These platforms 12-16 may be connected by a private data network which coordinates and manages appropriate conference flows to and from each of the conferees through the distributed platforms. The private data network may be located in either of the countries denoted in FIG. 1 or in a different location. Further, more than one private data network may be utilized without departing from the scope of the present invention. Such a plurality of data networks may be needed to accommodate additional bandwidth requirements, to minimize distance and latency issues associated with the location of the conferencing platforms, for redundancy considerations, and/or to provide a more distributed conferencing environment whereby certain functions are performed by one private data network and other functions are performed by another private data network. For example, certain functions may be specific to a conference host and thus those functions may reside on a private data network that are in closer proximity to the hosts conferencing platform. Such functions include managing the conference call, providing information to certain conferees, etc. Further, such functions may be "pushed" or provided to the host's conferencing platform or other equipment as soon as the host is identified.

The intelligence necessary to convert and transform between different signaling systems, formats, protocols, or the like, as may be necessitated by the international nature of the conference call, can be centered in one or more of the platforms 12-16 or in the private data network, rather than in the higher cost public switch telephone network (PSTN). Utilizing the present invention, the cost for connecting each international participant consists of the local charges to connect the international participant to the local platform, plus the cost of transmitting conferencing streams between each of the various platforms using the private data network. The latter cost is presumably significantly lower than dialing an international long distance call.

Some of the components of the conference platforms 12-16 and/or the private data network may include voice response units or enhanced media gateways (which, among other functionality, may provide a PSTN interface, control call flow, and perform outdials), proxy servers (which, among other functionality, may accept registrations from session initiation protocol (SIP) clients, send "heartbeats" to registered clients, and load balances requests across interface servers and mixers), application servers (which, among other functionality, may queue conference commands from the voice response unit or from an operator tool, process requests in queues, and update real-time conference states), mixers or media servers (which, among other functionality, may accept SIP commands to create and delete conferences and to add and drop participants, and mix real time transport protocol (RTP) streams together), and database servers (which, among other functionality, may maintain real-time conference states, house reporting and billing data, and house owner profile data). These components may be connected via, for example, a bus, Ethernet, local area network (LAN), wide area network (WAN), or directly (with, for example, the voice response unit coupled to the mixer via the proxy server, the interface server, and the database server. This functionality may further be combined in one or more of the aforementioned servers.

The conferences can be pre-scheduled, occur based on an action from one of the platforms 12-16, or can be distributed. To ensure bridges do not get linked without participants, at least one of the platforms 12-16 could require an indication that a participant is present before linking the bridge, could terminate the link if an indication is not received within a certain time frame before and/or after the conference call is scheduled to occur or has occurred, or could terminate the link if an indication is not received within a certain time frame before and/or after the bridges are linked. It is a further embodiment of the present invention to provide a single interlinking call between the bridges. As such, one of the platforms 12-16 can place a single call which then initiates the bridges associated with the rest of the platforms to be linked.

Another embodiment of the present invention includes the ability of some of the conferencing platforms 12-16 to include different components and/or to provide different functionality. For example, one platform may include a proxy server and media gateway, while another platform may include a voice response unit, a media gateway (or a voice response unit media gateway), a proxy server, a mixer, an application server, and a database server. The advantages of such a configuration include reduced space and power requirements, reduced cost, and media gateway support of international telephony protocols.

Another embodiment of the present invention includes utilizing a single platform between two different countries. For example, the platform can include a media gateway, a proxy server, a mixer, an application server, and a database server, where a connection from each country to the platform can occur via a PSTN connection from each country to the media gateway. Other embodiments of the present invention include utilizing similar platforms connected by a WAN for example, and further connected to a conferencing platform via a PSTN connection from each country to a voice response unit media gateway in each platform).

Further elements of the present invention include the ability for users to dial a local number which would cause platforms (for example, bridges), based on information that was previously submitted or submitted in real-time, to link themselves as needed. As such, entire bridges would become a single participant in the host bridge.

In another embodiment of the present invention, an interactive voice response (IVR) system or platform can be utilized. For example, participants and/or a host from Australia can join an IVR conference bridge by dialing a local number, and participants and/or a host from the United Kingdom can join an IVR conference bridge by dialing a local number. Via a data network, local IVR bridges communicate globally to determine the need for bridge linkage. In such a scenario, the UK bridge connects to the IVR bridge in Australia whereby only one country to country call is made and whereby users in each country dial a local number regardless of a host's location.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the system 10 can be performed by one or more of the modules or components described herein or in a distributed architecture. For example, all or part of the platforms 12-16, or the functionality associated with the platforms may be included within or co- located with one of the platforms or the private data network. Further, the functionality described herein may be performed at various times and in relation to various events, internal or external to the modules or components. Also, the information sent between various modules (including the platforms 12-16 and the private data network), can be sent between the modules via at least one of a data network, the Internet, a voice network, an Internet Protocol network, a wireless source, a wired source and/or via plurality of protocols.

What is claimed is:

1. A system for originating a conference call, comprising:
   at least one of a plurality of private data networks communicably coupled to:
      a first conferencing platform based in the United States;
      a second conferencing platform based in a second country different from the first conferencing platform; and
      a third conferencing platform based in a third country different from the first and second conferencing platforms;
   wherein each of the plurality of conferencing platforms:
      provides each of a plurality of participants to dial a local number linking the first, second and third conferencing platforms by linking bridges of the first, second and third conferencing platforms and enabling the bridges to become participants of a host bridge of the conference call;
  are coupled to at least one of the plurality of private data networks located in a different country than the location of each of the plurality of conferencing platforms,
wherein the at least one private data network:
  provides additional bandwidth requirements;
  minimizes call latency associated with conference platform locations; and
  provides redundancy for the conference call;
wherein the first conferencing platform dials the second conferencing platform and the third conferencing platform to provide a conference call between the second conferencing platform and the third conferencing platform, and wherein the first conferencing platform connects the conference call by linking the bridge between the second conferencing platform and the third conferencing platform after an indication that a participant is present at the second conferencing platform and that a participant is present at the third conferencing platform;
wherein the first conferencing platform dials the second conferencing platform and the third conferencing platform based on a response to an action taken by participants utilizing at least one of the first conferencing platform, the second conferencing platform and the third conferencing platform;
wherein establishing the conference call using the first conferencing platform is less expensive than a direct connection between the second conferencing platform and the third conferencing platform;
wherein utilizing the first conferencing platform is less expensive than a direct connection between the second conferencing platform and the third conferencing platform;
wherein utilizing the first conferencing platform triggers US-originated international telecom rates for the dialed calls;
wherein the first conferencing platform dials the second conferencing platform and the third conferencing platform based on a prescheduled time;
wherein at least one of the platforms terminates the link if an indication is not received within a certain time frame before the conference call is scheduled to occur or has occurred;
wherein to ensure conference platforms do not get linked without participants, at least one of the platforms terminates the link if an indication is not received within a certain time frame after the conference call is scheduled to occur or has occurred;
wherein a single interlinking call can be initiated between the conference platforms; and
wherein the cost for connecting each of the plurality of participants from their respective country comprises a local charge to connect the participants to their respective platform, and a cost measurement of transmitting conferencing streams between each of the platforms using a data network.

2. The system of claim 1, wherein the conferencing platforms include at least one of:
  a voice response unit;
  an enhanced media gateway
  a proxy server;
  an application server;
  mixers;
  media servers;
  and database servers.

3. A method for redirecting a call, comprising;
dialing, by a first conferencing platform based in the United States, a second conferencing platform based in a second country different from the first conferencing platform and a third conferencing platform based in a third country different from the first and second conferencing platforms to provide a conference call between the second conferencing platform and the third conferencing platform;
wherein the second conferencing platform is based outside of the United States;
wherein the third conferencing platform is based outside of the United States;
wherein the first conferencing platform is used only to connect and redirect the call to the second conferencing platform and the third conferencing platform;
wherein each of the plurality of conferencing platforms is configured to provide each of a plurality of participants to dial a local number linking the first, second and third conferencing platforms, by linking bridges of the first, second and third conferencing platforms and enabling the bridges to become participants of a host bridge of the conference call, and wherein each of the plurality of conferencing platforms are coupled to at least one of a plurality of private data networks located in a different country than the location of each of the plurality of conferencing platforms, wherein the at least one private data network provides additional bandwidth requirements, minimizes call latency associated with conference platform locations and provides redundancy for the conference call;
wherein the first conferencing platform provides the conference call by linking the bridge between the second conferencing platform and the third conferencing platform after an indication that a participant is present at the second conferencing platform and that a participant is present at the third conferencing platform;
wherein the first conferencing platform dials the second conferencing platform and the third conferencing platform based on a response to an action taken by participants utilizing at least one of the first conferencing platform, the second conferencing platform and the third conferencing platform;
wherein establishing the conference call using the first conferencing platform is less expensive than a direct connection between the second conferencing platform and the third conferencing platform;
wherein utilizing the first conferencing platform is less expensive than a direct connection between the second conferencing platform and the third conferencing platform;
wherein utilizing the first conferencing platform triggers US-originated international telecom rates for the dialed calls;
wherein the first conferencing platform dials the second conferencing platform and the third conferencing platform based on a prescheduled time;
wherein at least one of the platforms terminates the link if an indication is not received within a certain time frame before the conference call is scheduled to occur or has occurred;
wherein to ensure conference platforms do not get linked without participants, at least one of the platforms terminates the link if an indication is not received within a certain time frame after the conference call is scheduled to occur or has occurred;

wherein a single interlinking call can be initiated between the conference platforms; and wherein the cost for connecting each of the participants from their respective country comprises a local charge to connect the participants to their respective platform, and a cost measurement of transmitting conferencing streams between each of the platforms using a data network.

4. A non-transitory computer readable storage medium comprising instructions that when executed by a processor causes the processor to perform:

dialing, by a first conferencing platform based in the United States, a second conferencing platform based in a second country different from the first conferencing platform and a third conferencing platform based in a third country different from the first and second conferencing platforms to provide a conference call between the second conferencing platform and the third conferencing platform; and wherein the second conferencing platform is based outside of the United States;

wherein the third conferencing platform is based outside of the United States;

wherein the first conferencing platform is used only to connect and redirect the call to the second conferencing platform and the third conferencing platform;

wherein each of the plurality of conferencing platforms is configured to provide each of a plurality of participants to dial a local number linking the first, second and third conferencing platforms by linking bridges of the first, second and third conferencing platforms and enabling the bridges to become participants of a host bridge of the conference call, and wherein each of the plurality of conferencing platforms are coupled to at least one of a plurality of private data networks located in a different country than the location of each of the plurality of conferencing platforms, wherein the at least one private data network provides additional bandwidth requirements, minimizes call latency associated with conference platform locations and provides redundancy for the conference call;

wherein the first conferencing platform provides the conference call by linking the bridge between the second conferencing platform and the third conferencing platform after an indication that a participant is present at the second conferencing platform and that a participant is present at the third conferencing platform;

wherein the first conferencing platform dials the second conferencing platform and the third conferencing platform based on a response to an action taken by participants utilizing at least one of the first conferencing platform, the second conferencing platform and the third conferencing platform;

wherein establishing the conference call using the first conferencing platform is less expensive than a direct connection between the second conferencing platform and the third conferencing platform;

wherein utilizing the first conferencing platform is less expensive than a direct connection between the second conferencing platform and the third conferencing platform;

wherein utilizing the first conferencing platform triggers US-originated international telecom rates for the dialed calls;

wherein the first conferencing platform dials the second conferencing platform and the third conferencing platform based on a prescheduled time;

wherein at least one of the platforms terminates the link if an indication is not received within a certain time frame before the conference call is scheduled to occur or has occurred;

wherein to ensure conference platforms do not get linked without participants, at least one of the platforms terminates the link if an indication is not received within a certain time frame after the conference call is scheduled to occur or has occurred;

wherein a single interlinking call can be initiated between the conference platforms; and wherein the cost for connecting each of the plurality of participants from their respective country comprises a local charge to connect the participants to their respective platform, and a cost measurement of transmitting conferencing streams between each of the platforms using a data network.

* * * * *